United States Patent
Taga et al.

[11] Patent Number: 5,978,529
[45] Date of Patent: Nov. 2, 1999

[54] GAIN EQUALIZER AND OPTICAL AMPLIFYING TRANSMISSION LINE

[75] Inventors: Hidenori Taga; Noriyuki Takeda; Masatoshi Suzuki; Shu Yamamoto; Shigeyuki Akiba, all of Tokyo, Japan

[73] Assignee: Kokusai Denshin Denwa Kabushiki Kaisha, Tokyo, Japan

[21] Appl. No.: 09/036,485

[22] Filed: Mar. 6, 1998

[30] Foreign Application Priority Data

Apr. 7, 1997 [JP] Japan ..................................... 9-088245

[51] Int. Cl.$^6$ ...................................................... G02B 6/28
[52] U.S. Cl. .................. 385/24; 385/27; 385/48; 385/141; 372/70; 359/333
[58] Field of Search ...................... 385/24, 22, 27, 385/16, 48, 23, 141; 372/6, 70; 359/127, 124, 160, 333, 341, 339

[56] References Cited

U.S. PATENT DOCUMENTS

| 5,276,534 | 1/1994 | Olshansky | 359/124 |
| 5,436,760 | 7/1995 | Nakabayashi | 359/341 |

*Primary Examiner*—Phan T. H. Palmer
*Attorney, Agent, or Firm*—Christie, Parker & Hale, LLP

[57] ABSTRACT

This invention provides the gain equalizer positioned to an optical amplifying transmission line for equalizing gains of said optical amplifying transmission line, comprising a plurality of first optical filters varying transmittance periodically in at least predetermined wavelength range, and one or more second optical filters that their transmittance peaks at a wavelength substantially coinciding to the predetermined transmittance bottom wavelength of the first optical filters and decreases in a predetermined range at both side of the predetermined transmittance bottom wavelength.

18 Claims, 3 Drawing Sheets

GAIN EQUALIZER AND OPTICAL AMPLIFYING TRANSMISSION LINE

FIELD OF THE INVENTION

This invention relates to a gain equalizer for flattening gains of an optical amplifying transmission line within predetermined wavelengths and an optical amplifying transmission line wherein gains are flattened within predetermined wavelengths.

BACKGROUND OF THE INVENTION

In a long-distance optical amplifying transmission system, optical fibers for transmission are connected and repeated by optical amplifiers, for example, erbium-doped optical fiber amplifiers. Gains of an optical amplifier generally have strong dependency on wavelengths and show gain wavelength characteristics of a mountain-shaped curve in the bandwidth of 1,550 nm used for long-distance optical fiber transmission.

As a method for equalizing, namely flattening, these gain wavelength characteristics of an optical amplifier, usually optical filters, for example, etalons, are connected to the optical amplifier in series. The optical filters need to have hollow or M-shaped transmittance characteristics for obtaining the lowest transmittance against the peak of gain wavelength characteristics of the optical amplifier. In short, an optical filter getting the lowest transmittance at the peak wavelength of gains of an optical amplifier has to be prepared.

In gain wavelength characteristics of an optical amplifier, however, both of the gain wavelength characteristics curve and the peak wavelength generally exhibit irregular. In spite of the above-mentioned circumstance, conventional arts try to equalize gain wavelength characteristics of individual optical amplifiers by using optical filters. Therefore, optical filters to be connected in series had to be arranged and adjusted for individual optical amplifiers. The gain peak wavelength of an optical fiber amplifier and the transmittance bottom wavelength of optical filters must be precisely coinciding. Furthermore, the trough depth of transmittance of an optical filter has to be as close as possible to the peak height of gain of an optical fiber amplifier. These arrangements are very difficult and, in addition to that, gain wavelength characteristics of an optical fiber amplifier vary depending to the gains, output power, etc. demanding to redesign optical filters in accordance with the specifications and the usages.

Accordingly, it needed plenty of work to obtain flat gain wavelength characteristics in a certain wavelength width, for example, in a wavelength division multiplexing transmission system.

SUMMARY OF THE INVENTION

An object of the invention is to provide a gain equalizer for easily equalizing gain wavelength characteristics of transmission lines without being restricted by gain wavelength characteristics of individual optical amplifiers and an optically amplifying transmission line wherein gains are flat within predetermined wavelengths.

The invention provides a plurality of first optical filters varying transmittance periodically at least within predetermined wavelengths and one or more second optical filters which transmittance peaks at a wavelength substantially coinciding with the transmittance bottom wavelength of the first optical filters and decreases at both sides in predetermined limits in an optical amplifying transmission line.

Gain wavelength characteristics of an optical amplifier having individual differences are essentially unified by the first optical filters and the resultant gain wavelength characteristics within the predetermined wavelengths are flattened by the second optical filters.

The flattening by the second optical filters can be more effective for making the gain peak wavelength of the optical amplifiers in the optical amplifying transmission line located between the transmittance peak wavelength and the adjacent transmittance bottom wavelength on longer wavelength side of said first optical filters.

It is easy to realize the invention by using etalon filters of the narrow free spectral range(FSR) as the first optical filters and etalon filters of the wide FSR as the second filters and besides the wavelength characteristics can be set up accurately.

DESCRIPTION OF THE PREFERRED EMBODIMENTS

The preferred embodiment of the invention is explained in detail referring to drawings.

Figure 1:
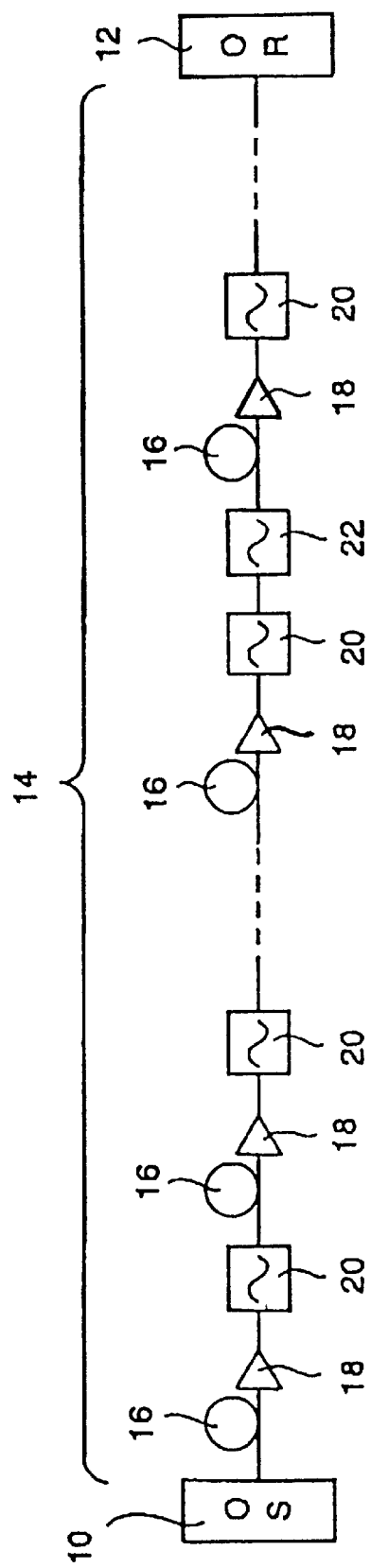
FIG. 1 is a schematic block diagram showing a general construction of an embodiment of the invention.

FIG. 1 shows a schematic block diagram of an embodiment of the invention. An optical fiber transmission line 14 is connected between an optical sending station 10 and an optical receiving station 12. The optical fiber transmission line 14 comprises an optical amplifying repeating transmission line for repeating and amplifying numerous transmission optical fibers 16 by using optical amplifiers 18(for example, erbium-doped optical fiber amplifiers). In the embodiment, narrow FSR etalon filters 20 are frequently inserted to the optical fiber transmission line 14 and wide FSR etalon filters 22 are inserted at long intervals to the optical fiber transmission line 14. As explained concretely, making a certain length as a unit, the narrow FSR etalon filters 20 are inserted to output stages of all the optical amplifiers 18 except the last optical amplifier 18 and the narrow FSR etalon filter 20 and the wide FSR etalon filter 22 are inserted to the last optical amplifier 18.

By unifying the optical amplifiers 18 and the etalon filters 20 or the optical amplifiers 18 and the etalon filters 20, 22 as an optical amplifying repeater, the operation becomes easier.

In FIG. 1, both of the etalon filter 20 and the etalon filter 22 are connected to the last optical amplifier 18 of an insertion period of the etalon filters 22 for an easy understanding of functions of the etalon filters 20 and 22. Apparently the etalon filter 22 alone can be connected.

FIG. 2 shows gains of the optical amplifier 18, an example of wavelength characteristics of the transmittance of the etalon filters 20 and 22 and overall gain wavelength characteristics of the insertion unit distance of the etalon filters 22. FIG. 2(a) shows gain wavelength characteristics of the optical amplifier 18, FIG. 2(b) shows transmittance wavelength characteristics of the etalon filter 20, FIG. 2(c) shows transmittance wavelength characteristics of the etalon filter 22 and FIG. 2(d) shows overall gain wavelength characteristics of an insertion unit distance of the etalon filter 22.

Figures 3A, 3B, 3C:
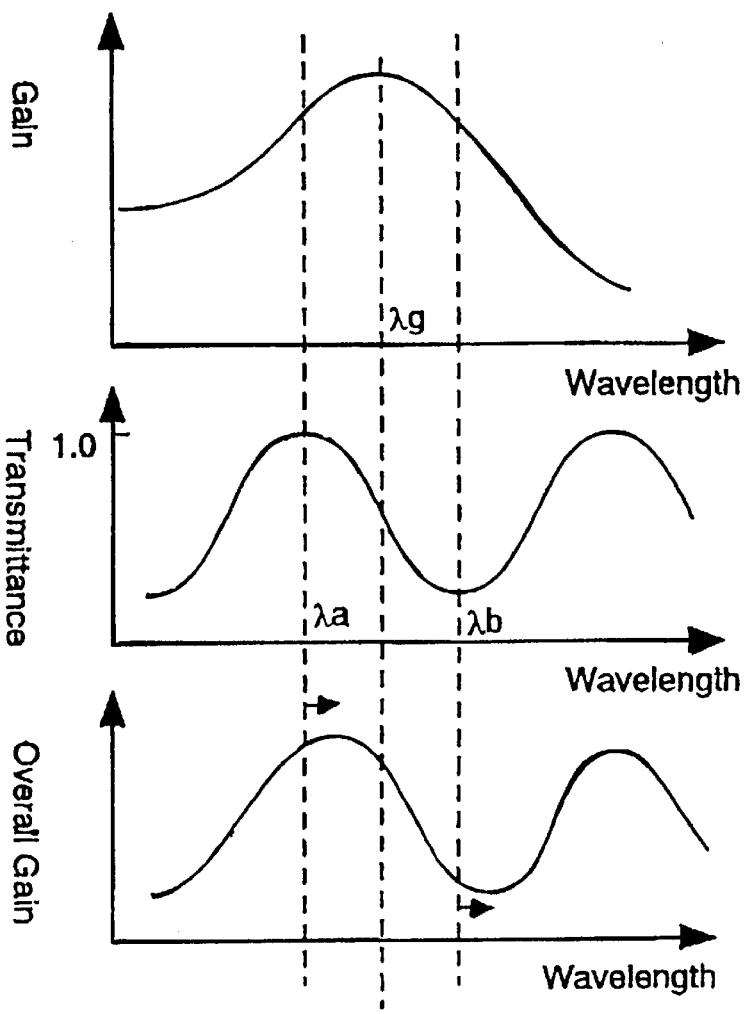
FIG. 3(a) shows gain wavelength characteristics of the optical amplifier 18.
FIG. 3(b) shows transmittance wavelength characteristics of the etalon filter 20 and FIG. 3(c) shows synthetic gain wavelength characteristics.

Transmittance wavelength characteristics of the etalon filter 20 are designed as a period of FSR includes the use bandwidth of the optical amplifier 18, namely, the bandwidth of signal lights of a wavelength division multiplexing transmission system, and also a peak wavelength $\lambda g$ of gains of the optical amplifier 18 is located in the middle of the transmittance peak wavelength $\lambda a$ and the transmittance bottom wavelength $\lambda b$ of the etalon filter 20. FIG. 3 shows relations between the wavelength characteristics of the optical amplifier 18 and the etalon filter 20 and the synthetic gain wavelength characteristics. FIG. 3(a) shows gain wavelength characteristics of the optical amplifier 18, FIG. 3(b) shows transmittance wavelength characteristics of the etalon filter 20 and FIG. 3(c) shows synthetic gain wavelength characteristics.

In the synthetic gains of the optical amplifier 18 and the etalon filter 20, as shown in FIG. 3(c), both the gain peak wavelength and the gain bottom wavelength shift to the long wavelength side affected by the gain wavelength characteristics of the optical amplifier 18 compared to the transmittance maximum wavelength $\lambda a$ and the transmittance minimum wavelength $\lambda b$ of the etalon filter 20, and the influence is very few because of the pulling effect. Fundamental changes are determined by the etalon filter 20. That is, the maximum gain of the synthetic gain wavelength characteristics of the optical amplifier 18 and etalon filter 20 is locked to the minimum insertion loss wavelength of the etalon filter 20, namely, to the transmittance maximum wavelength $\lambda a$.

The minimum transmittance of the etalon filter 20 is set according to the bandwidth desired to be flatten. In case of flattening a narrow bandwidth, the minimum transmittance becomes high and in case of flattening a wide bandwidth, the minimum transmittance becomes low. Ideally, the maximum transmittance is 100%. When using an etalon filter of 15 nm FSR, for example, the minimum transmittance is 90%. Accordingly, an etalon filter of the FSR narrower than the 15 nm FSR has the minimum transmittance of more than 90% and an etalon filter of the FSR wider than the 15 nm FSR has the minimum transmittance of less than 90%.

Figure 2A:
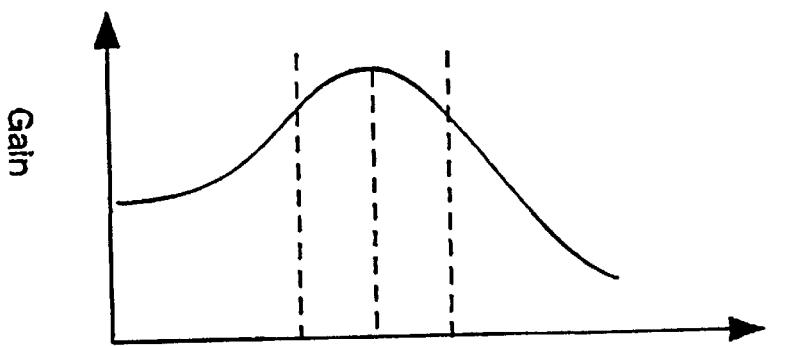
FIG. 2(a) shows gain wavelength characteristics of an optical amplifier 18.
Figure 2B:
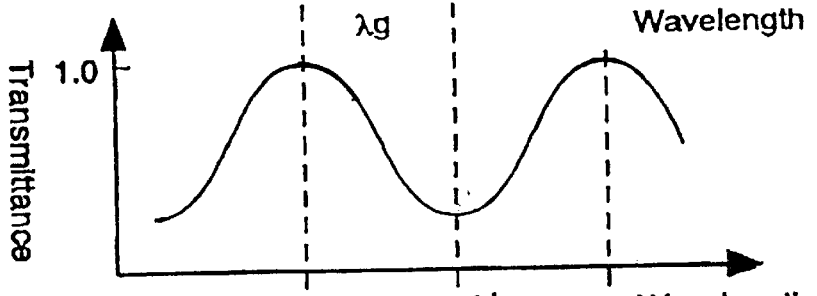
FIG. 2(b) shows transmittance wavelength characteristics of etalon filters 20, 22.
Figure 2C:
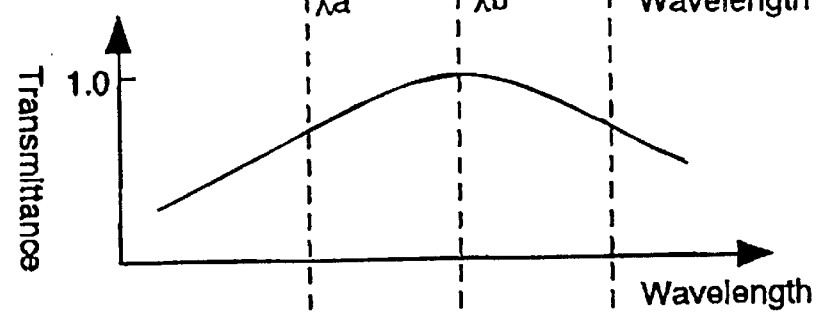
FIG. 2(c) shows transmittance wavelength characteristics of etalon filter 22 and FIG. 2(d) shows synthetic gain wavelength characteristics of an etalon filter 22 per insertion unit of an embodiment of the invention.

Transmittance wavelength characteristics of the etalon filter 22, as shown in FIG. 2(c), are designed that the FSR can cover sufficiently plural periods of the etalon filter 20 and the gain peak wavelength coincides with the transmittance bottom wavelength $\lambda b$ of the etalon filter 20. In other words, the transmittance wavelength characteristics of the etalon filter 22 are designed to compensate and flatten the depression of the transmittance in a period of the etalon filter 20. The individual differences of the transmittance wavelength characteristics of the etalon filters 20 and 22 are little, and the etalon filters 20 and 22 can be designed and produced precisely. Therefore, it is easy to have them ready beforehand.

Concretely, the transmittance of the etalon filter 22 is set up accordingly to the insertion interval. In case that the etalon filters 22 are to be inserted to every 10 etalon filters 20, the difference between the maximum transmittance and the minimum transmittance of the etalon filters 22 is five times as much as the difference of the maximum transmittance and the minimum transmittance of the etalon filters 20.

Figure 2D:
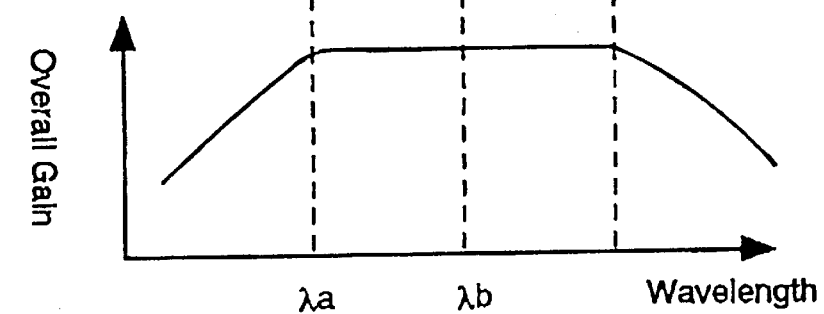

In the insertion period of the etalon filter 22, the overall gain wavelength characteristics, as shown in FIG. 2(d), becomes flat at the short wavelength side and the long wavelength side of the wavelength $\lambda b$ for the length equal to one period of the etalon filter 20. In the part equal to almost one period of the etalon filter 20 centering the wavelength $\lambda b$, it is flattened successfully as a whole. Although the gains are varied by the gain wavelength characteristics of the optical amplifier 18, the influence is very little.

In the above-mentioned embodiment, the etalon filters 20 are connected to every optical amplifiers 18. However, it is also possible that the etalon filters 20 are connected to the optical amplifiers 18 of appropriate intervals, for example, one etalon filter 20 can be connected to every two optical amplifiers 18. In this case, the difference between the maximum transmittance and the minimum transmittance of the etalon filter inserted every two optical amplifiers should be simply twice as much as the difference of the maximum transmittance and the minimum transmittance of the etalon filter inserted to every optical amplifiers. It is obvious that the overall gain wavelength characteristics can be flattened successfully by inserting the etalon filters 20 frequently.

In the embodiment, the etalon filters 20 and 22 are connected to the output side of the optical amplifier 18. However, the etalon filters 20 and 22 can be connected to the input side of the optical amplifier 18 as well.

It will readily be understood from the foregoing description that the invention makes it possible by using two kinds of optical filters for a wide use to absorb the difference of the gain wavelength characteristics of individual optical amplifiers and flatten the overall gain wavelength characteristics in a desired signal bandwidth.

We claim:

1. A gain equalizer for an optical amplifying transmission line for equalizing gains of said optical amplifying transmission line, comprising:

a plurality of first optical filters each having varying transmittance periodically in at least a predetermined wavelength range, one or more second optical filters having a transmittance which peaks at a wavelength substantially coinciding to the predetermined transmittance bottom wavelength of said first optical filters and decreases in a predetermined range on both sides of the predetermined transmittance bottom wavelength.

2. A gain equalizer as defined in claim 1 wherein a gain peak wavelength of an optical amplifier of said optical amplifying transmission line is placed between a transmittance peak wavelength and an adjacent transmittance bottom wavelength located on a long wavelength side compared to the transmittance peak wavelength of said first optical filters.

3. A gain equalizer as defined in claim 1 wherein said first filters comprise etalon filters of the narrow FSR and said second optical filter comprises etalon filters of the wide FSR.

4. An optically amplifying transmission line comprising:

one or more optical transmission mediums, one or more optical amplifiers for connecting said one or more optical transmission mediums and amplifying transmission lights, a plurality of first optical filters each having varying transmittance periodically in at least a predetermined wavelength range, one or more second optical filters each having a transmittance which peaks at a wavelength substantially coinciding to the transmittance bottom wavelength of said first optical filters and decreases in a predetermined range on both side of the predetermined transmittance bottom wavelength.

5. An optical amplifying transmission line as defined in claim 4 wherein the gain peak wavelength of said optical amplifier is placed between the transmittance peak wavelength and the adjacent transmittance bottom wavelength located on a long wavelength side compared to the transmittance peak wavelength of said first optical filters.

6. An optical amplifying transmission line as defined in claim 4 wherein said first optical filters comprise etalon filters of the narrow FSR and said one or more second optical filters comprises etalon filters of the wide FSR.

7. A gain equalizer for equalizing gain of an optical amplifying transmission line, comprising:
 a plurality of first optical filters each having a transmittance which varies periodically as a function of wavelength, said transmittance being highest at a first wavelength and lowest at a second wavelength in one of such periods; and
 a second optical filter having a transmittance which peaks at the second wavelength and decreases on both sides of said second wavelength over a predetermined wavelength band.

8. The gain equalizer of claim 7 further comprising an optical amplifier having a gain which peaks at a wavelength longer than the first wavelength and shorter than the second wavelength in said one of such period.

9. The gain equalizer of claim 7 wherein each of said first filters comprises an etalon filter having a FSR, and the second optical filter comprises an etalon filter having a wider FSR than the FSR of said first filters.

10. An optical amplifying transmission line, comprising:
 an optical transmission medium for transmitting light;
 an optical amplifier for amplifying the light transmitted by the optical transmission medium;
 a plurality of first optical filters connected to the optical transmission medium, each of the first optical filters having a transmittance which varies periodically as a function of wavelength, said transmittance being highest at a first wavelength and lowest at a second wavelength in one of such periods; and
 a second optical filter connected to the optical transmission medium, said second optical filter having a transmittance which peaks at the second wavelength and decreases on both sides of said second wavelength over a predetermined wavelength band.

11. The optical amplifying transmission line of claim 10 wherein said optical amplifier has a gain which peaks at a wavelength longer than the first wavelength and shorter than the second wavelength in said one of such periods.

12. The optical amplifying transmission line of claim 10 wherein each of said first optical filters comprises an etalon filter having a FSR, and said second optical filter comprises an etalon filter having a wider FSR than the FSR of said first filters.

13. A gain equalizer for equalizing gain of an optical amplifying transmission line, comprising:
 a plurality of stationary first optical filters each having a transmittance which varies periodically as a function of wavelength, said transmittance being highest at a first wavelength and lowest at a second wavelength in one of such periods; and
 a stationary second optical filter having a transmittance which peaks at the second wavelength and decreases on both sides of said second wavelength over a predetermined wavelength band.

14. The gain equalizer of claim 13 further comprising an optical amplifier having a gain which peaks at a wavelength shorter than the first wavelength and longer than the second wavelength in said one of such periods.

15. The gain equalizer of claim 13 wherein each of said first filters comprises an etalon filter having a FSR, and the second optical filter comprises an etalon filter having a wider FSR than the FSR of said first filters.

16. An optical amplifying transmission line, comprising:
 an optical transmission medium for transmitting light;
 an optical amplifier for amplifying the light transmitted by the optical transmission medium;
 a plurality of first optical filters fixed to the optical transmission medium in a stationary position, each of the first optical filters having a transmittance which varies periodically as a function of wavelength, said transmittance being highest at a first wavelength and lowest at a second wavelength in one of such periods; and
 a second optical filter fixed to the optical transmission medium in a stationary position, said second optical filter having a transmittance which peaks at the second wavelength and decreases on both sides of said second wavelength over a predetermined wavelength band.

17. The optical amplifying transmission line of claim 16 wherein said optical amplifier has a gain which peaks at a wavelength shorter than the first wavelength and longer than the second wavelength in said one of such periods.

18. The optical amplifying transmission line of claim 16 wherein each of said first optical filters comprises an etalon filter having a FSR, and said second optical filter comprises an etalon filter having a wider FSR than the FSR of said first filters.

* * * * *